United States Patent
Rosenberger et al.

(10) Patent No.: US 12,180,106 B2
(45) Date of Patent: Dec. 31, 2024

(54) METHODS FOR PRODUCING A HOLLOW-CORE FIBER AND FOR PRODUCING A PREFORM FOR A HOLLOW-CORE FIBER

(71) Applicants: HERAEUS QUARZGLAS GMBH & CO. KG, Hanau (DE); HERAEUS QUARTZ NORTH AMERICA LLC, Buford, GA (US)

(72) Inventors: Manuel Rosenberger, Hanau (DE); Jan Vydra, Hanau (DE); Kai Huei Chang, Alpharetta, GA (US); Qiulin Ma, Decatur, GA (US)

(73) Assignees: HERAEUS QUARZGLAS GMBH & CO. KG, Hanau (DE); HERAEUS QUARTZ NORTH AMERICA LLC, Buford, GA (US)

( * ) Notice: Subject to any disclaimer, the term of this patent is extended or adjusted under 35 U.S.C. 154(b) by 388 days.

(21) Appl. No.: 17/617,779

(22) PCT Filed: Jul. 15, 2020

(86) PCT No.: PCT/EP2020/069980
§ 371 (c)(1),
(2) Date: Dec. 9, 2021

(87) PCT Pub. No.: WO2021/009213
PCT Pub. Date: Jan. 21, 2021

(65) Prior Publication Data
US 2022/0227656 A1 Jul. 21, 2022

Related U.S. Application Data

(60) Provisional application No. 62/875,303, filed on Jul. 17, 2019.

(30) Foreign Application Priority Data

Aug. 1, 2019 (EP) .................................... 19189575

(51) Int. Cl.
C03B 37/012 (2006.01)
C03B 37/027 (2006.01)

(52) U.S. Cl.
CPC .... C03B 37/0122 (2013.01); C03B 37/01234 (2013.01); C03B 37/02781 (2013.01);
(Continued)

(58) Field of Classification Search
None
See application file for complete search history.

(56) References Cited

U.S. PATENT DOCUMENTS

2003/0172682 A1  9/2003  Sato et al.
2003/0230118 A1  12/2003  Dawes et al.
(Continued)

FOREIGN PATENT DOCUMENTS

CN  106796322 A  5/2017
CN  108473356 A  8/2018
(Continued)

OTHER PUBLICATIONS

International Search Report and Written Opinion mailed Oct. 5, 2020 by the European Patent Office in its capacity as International Searching Authority for counterpart international patent application No. PCT/EP2020/069980 (with English translations attached).
(Continued)

*Primary Examiner* — Queenie S Dehghan
(74) *Attorney, Agent, or Firm* — Panitch Schwarze Belisario & Nadel LLP

(57) ABSTRACT

To achieve a high degree of precision and an exact positioning of anti-resonant elements in a sufficiently stable and
(Continued)

Figure 7:
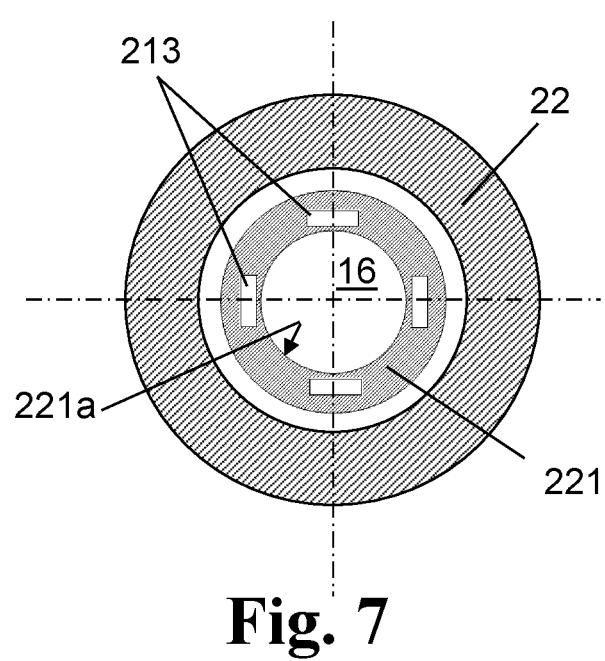

reproducible manner in an anti-resonant hollow-core fiber which has a hollow core extending along a fiber longitudinal axis and an inner jacket region that surrounds the hollow core, formation of anti-resonant element precursors includes formation of elongated pressure chambers, each of which adjoins a wall deformable under pressure and heat in the region of target positions of the anti-resonant elements. A section of the deformable wall is caused to protrude in the direction of a cladding tube inner bore, thereby forming an anti-resonant element or a precursor for same, while carrying out a process of elongating a primary preform to form the hollow-core fiber or further processing the primary preform to a secondary preform from which the hollow-core fiber is drawn.

13 Claims, 3 Drawing Sheets

(52) U.S. Cl.
CPC ...... *C03B 2203/16* (2013.01); *C03B 2203/32* (2013.01); *C03B 2203/42* (2013.01)

(56) References Cited

U.S. PATENT DOCUMENTS

| | | | |
|---|---|---|---|
| 2004/0096173 | A1 | 5/2004 | Fekety et al. |
| 2005/0226578 | A1 | 10/2005 | Mangan et al. |
| 2006/0046075 | A1 | 3/2006 | Maul et al. |
| 2006/0130528 | A1 | 6/2006 | Nelson et al. |
| 2008/0310806 | A1 | 12/2008 | Mukasa |
| 2009/0019893 | A1 | 1/2009 | Bogdahn |
| 2017/0261423 | A1 | 9/2017 | Weidlich et al. |
| 2018/0339931 | A1 | 11/2018 | Simonsen et al. |
| 2020/0319400 | A1* | 10/2020 | Uebel ................ G02B 6/02366 |
| 2022/0267192 | A1* | 8/2022 | Rosenberger ....... C03B 37/0124 |

FOREIGN PATENT DOCUMENTS

| | | | | |
|---|---|---|---|---|
| DE | 102004054392 | A1 | 3/2006 | |
| DE | 102005028219 | B3 | 10/2006 | |
| DE | 102014011041 | A1 | 1/2016 | |
| EP | 3136143 | A1 | 3/2017 | |
| GB | 2566466 | A | 3/2019 | |
| WO | WO-02072489 | A2 * | 9/2002 | ......... B23K 26/0624 |
| WO | 200901317 | A1 | 12/2008 | |
| WO | 2018/169487 | A1 | 9/2018 | |
| WO | 2019/008352 | A1 | 1/2019 | |

OTHER PUBLICATIONS

Jasion, Gregory T. et al., "Fabrication of tubular anti-resonant hollow core fibers: modelling, draw dynamics and process optimization" Optics Express vol. 27, No. 15, pp. 20567-20582, Jul. 2019 (DOI: 10.1364/OE.27.020567).

Kosolapov, A.F. et al., "Hollow-core revolver fibre with a double-capillary reflective cladding" Quantum Electronics 46 (3) Mar. 29, 2016 pp. 267-270 (DOI: 10.1070/QEL15972).

Nawazuddin, M.B.S. et al., "Lotus Shaped Negative Curvature Hollow Core Fibre with 10.5 dB/km at 1550 nm. Wavelength" 2017 European Conference on Optical Communication (ECOC), IEEE, (2017) pp. 1-3 (DOI: 10.1109/ ECOC.2017.8346101).

Poletti, Francesco "Nested antiresonant nodeless hollow core fiber," Optics Express, vol. 22, No. 20 (2014) pp. 23807-23828 (DOI:10.1364/OE 22.023807).

Sherlock, Ben et al., "Tunable fibre-coupled multiphoton microscopy with a negative curvature fibre" Journal of Biophotonics, vol. 9, No. 7, pp. 715-720, (2016) (DOI: 10.1002/jbio.201500290).

Yu, Fei, "Chapter 4—Fabrication of hollow core negative curvature fibre" IN "Hollow core negative curvature fibres" University of Bath PhD. pp. 59-74, Dec. 31, 2013 (XP055656461).

Office Action issued Mar. 19, 2023 in CN Application No. 202080035459.9 with English Summary.

\* cited by examiner

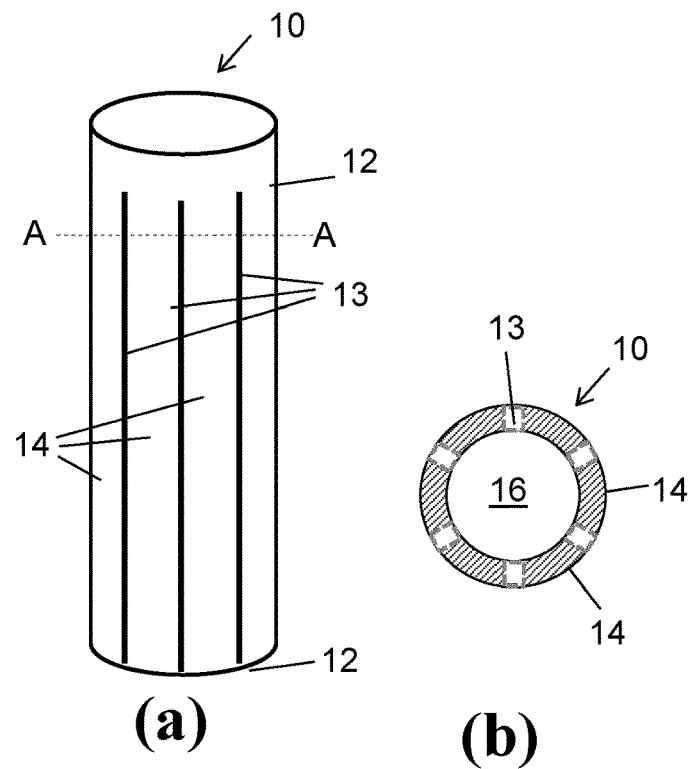
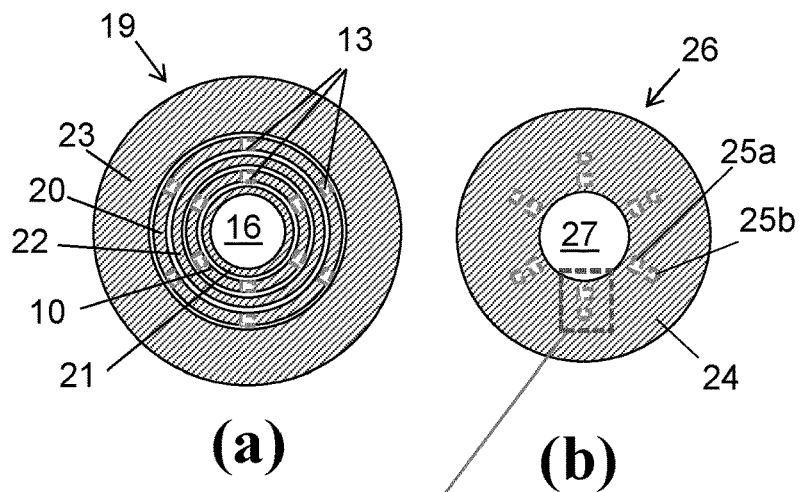
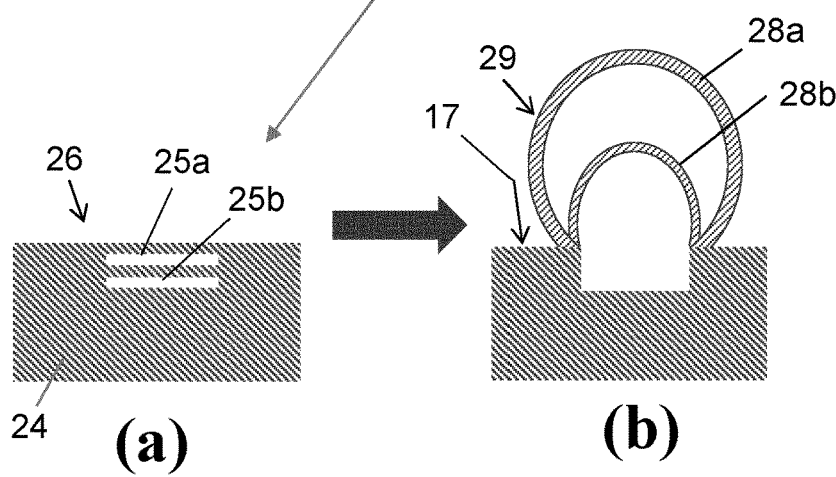
Fig. 1
Fig. 2
Fig. 3

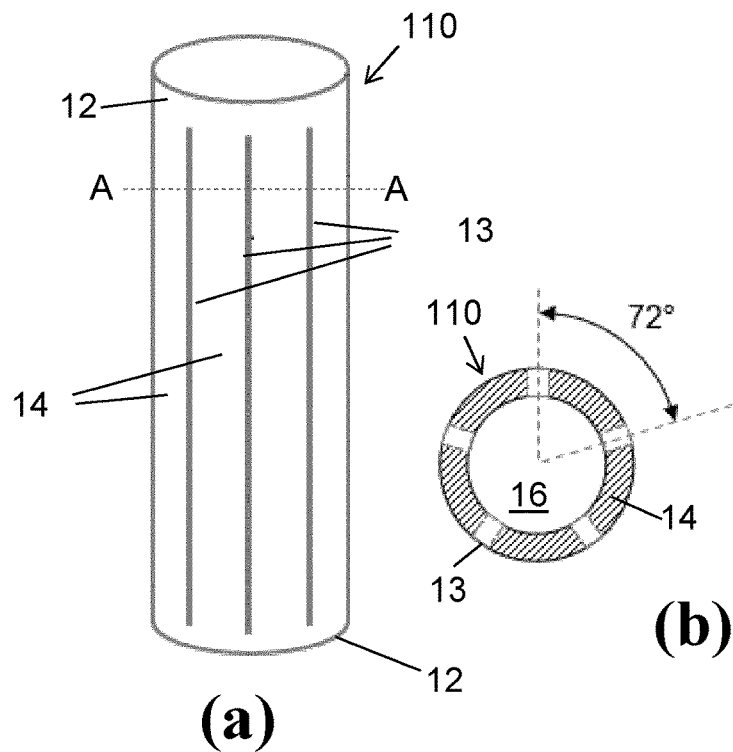
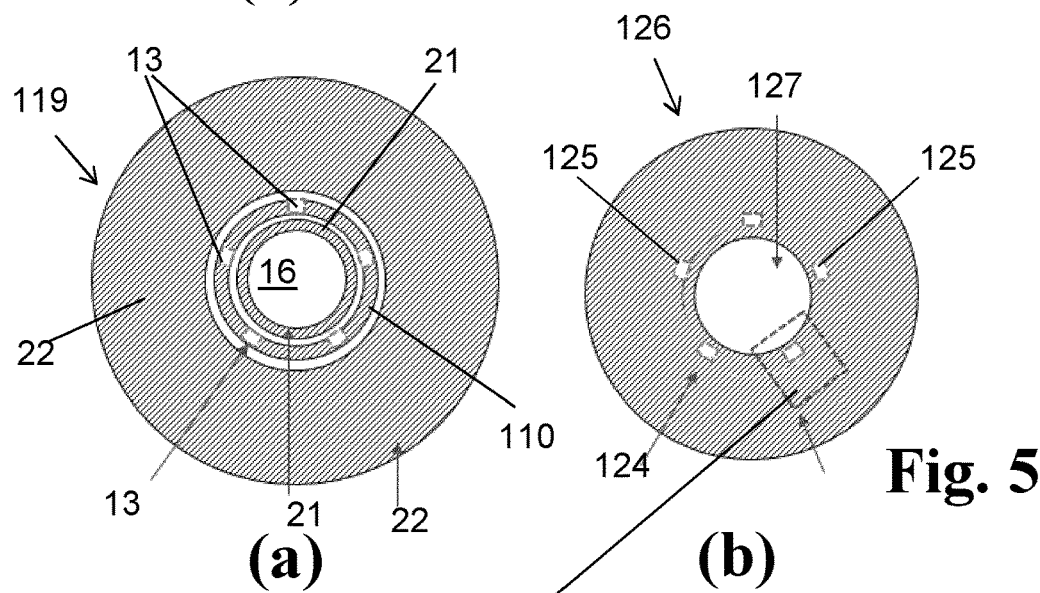
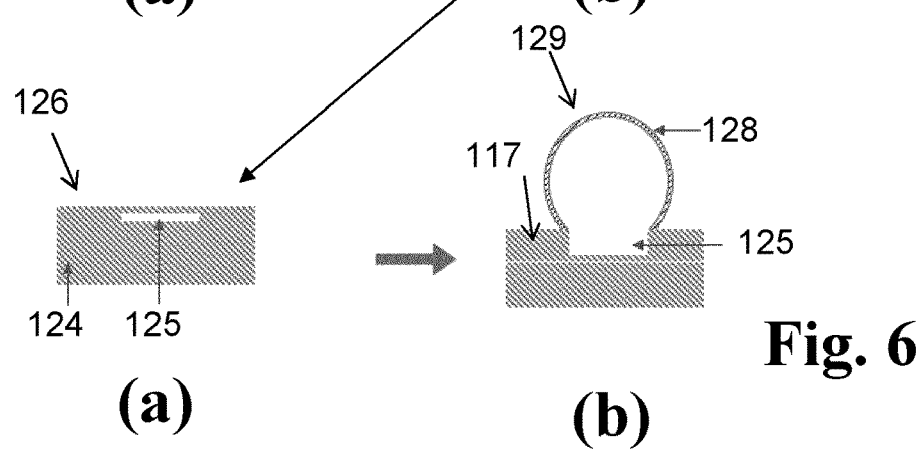
Fig. 4
Fig. 5
Fig. 6

METHODS FOR PRODUCING A HOLLOW-CORE FIBER AND FOR PRODUCING A PREFORM FOR A HOLLOW-CORE FIBER

TECHNICAL BACKGROUND

The invention relates to a method for producing an anti-resonant hollow-core fiber comprising a hollow core extending along a longitudinal axis of the fiber and a sheath region surrounding the hollow core, which sheath region comprises a number of anti-resonance elements, having the method steps of:
(a) providing a primary preform for the hollow-core fiber, which preform has at least one cladding tube having an inner cladding tube bore and a longitudinal cladding tube axis, along which a cladding tube wall delimited by an inner side and an outer side extends,
(b) forming a number of precursors for anti-resonance elements at setpoint positions of the cladding tube wall, and
(c) elongating the primary preform to form the hollow-core fiber or further processing the primary preform to form a secondary preform from which the hollow-core fiber is drawn, wherein the further processing comprises carrying out one or more of the following hot-forming processes once or repeatedly:
(i) elongation,
(ii) collapse,
(iii) collapse and simultaneous elongation,
(iv) collapse of additional sheath material,
(v) collapse of additional sheath material and subsequent elongation,
(vi) collapse of additional sheath material and simultaneous elongation.

The invention also relates to a method for producing a preform for an anti-resonant hollow core fiber comprising a hollow core extending along a longitudinal axis of the fiber and a sheath region surrounding the hollow core, which sheath region comprises a number of anti-resonance elements, having the method steps of:
(a) providing a primary preform for the hollow-core fiber, which preform has at least one cladding tube having an inner cladding tube bore and a longitudinal cladding tube axis, along which a cladding tube wall delimited by an inner side and an outer side extends,
(b) forming a number of precursors for anti-resonance elements at setpoint positions of the cladding tube wall,
(c) optional further processing of the primary preform to form a secondary preform for the hollow-core fiber, wherein the further processing comprises carrying out one or more of the following hot-forming processes once or repeatedly:
(i) elongation,
(ii) collapse,
(iii) collapse and simultaneous elongation,
(iv) collapse of additional sheath material,
(v) collapse of additional sheath material and subsequent elongation,
(vi) collapse of additional sheath material and simultaneous elongation.

Conventional single-mode optical fibers made of solid material have a core region made of glass, which is surrounded by a sheath region made of glass with a lower refractive index. Light guidance is based thereby upon total reflection between the core and sheath region. However, the interactions of the guided light with the solid material are associated with an increased latency in data transmission and relatively low damage thresholds vis-à-vis high-energy radiation.

These disadvantages are prevented or reduced by "hollow core fibers" in which the core comprises an evacuated cavity filled with gas or liquid. In hollow-core fibers, the interaction of the light with the glass is less than in solid core fibers. The refractive index of the core is less than that of the sheath, so that light guidance by total reflection is not possible, and the light would normally escape from the core into the sheath. As a function of the physical mechanism of the light guidance, hollow-core fibers are divided into "photonic bandgap fibers" and "anti-resonance reflection fibers."

In the case of "photonic bandgap fibers," the hollow core region is surrounded by a sheath in which small hollow channels are arranged periodically. On the basis of semiconductor technology, the periodic structure of the hollow channels in the sheath brings about the effect referred to as the "photonic bandgap," according to which light of certain wavelength ranges scattered at the sheath structures can, due to Bragg reflection, constructively interfere in the central cavity and cannot propagate transversely in the sheath.

In the embodiment of the hollow-core fiber referred to as "anti-resonant hollow-core fiber" (ARHCF), the hollow core region is surrounded by an inner sheath region in which so-called "anti-resonant elements" (or "anti-resonance elements"; "ARE's" for short) are arranged. The walls of the anti-resonance elements evenly distributed around the hollow core can act as Fabry-Perot cavities operated in anti-resonance, which reflect the incident light and guide it through the fiber core.

This fiber technology promises a low optical attenuation, a very broad transmission spectrum (even in the UV or IR wavelength ranges) and a low latency in data transmission.

Potential applications of the hollow core fibers lie in the fields of data transmission, high-power beam guidance (e.g., for material processing), modal filtering, non-linear optics—in particular, for super-continuum generation, from the ultraviolet to infrared wavelength range.

PRIOR ART

A disadvantage of anti-resonant hollow-core fibers is that higher-order modes are not necessarily suppressed, so that they are often not exclusively single-mode over long transmission lengths, and the quality of the output beam deteriorates.

In the paper by Francesco Poletti, "Nested anti-resonant nodeless hollow core fiber," Optics Express, vol. 22, no. 20 (2014), DOI: 10.1364/OE 22.023807, a fiber design is proposed in which anti-resonance elements are not designed as a simple singular structural element, but are composed of several, nested structural elements. The nested anti-resonance elements are designed such that higher-order core modes are phase-matched to the sheath modes and are suppressed, but not the fundamental core mode. As a result, the propagation of the fundamental core mode is always ensured, and the hollow-core fiber can be effectively single-mode over a limited wavelength range.

Effective mode suppression depends upon the center wavelength of the transmitted light and on the structural parameters of the fiber design, such as the radius of the hollow core and the difference in the diameters of nested ring structures in the anti-resonance elements.

EP 3 136 143 A1 discloses an anti-resonant hollow-core fiber (referred to therein as "hollow-core fiber of non-bandgap type"), in which the core can conduct further modes in addition to the fundamental mode. For this purpose, it is surrounded by an inner sheath having "non-resonant elements" which provide a phase-matching of anti-resonant modes with the higher modes. The hollow-core fiber is produced according to what is known as a "stack-and-draw technique" by arranging the starting elements to form an axially-parallel ensemble and fixing them to form a preform, and then elongating the preform. In this case, a cladding tube with a hexagonal inner cross-section is used, and six so-called "ARE preforms" (anti-resonance element preforms) are fixed in the inner edges of the cladding tube. This preform is drawn in two stages to form a hollow-core fiber.

WO 2018/169487 A1 discloses a method for producing a preform for anti-resonant hollow-core fibers in which a first sheath region comprises a plurality of rods, and a second sheath region comprises a plurality of tubes surrounded by an outer cladding tube. Rods, tubes, and cladding tube are joined to form a preform by means of the "stack and draw" technique. Before the preform is elongated, the preform end is sealed, which is done by applying a sealing compound. For example, a UV adhesive is used as the sealing compound.

Technical Object

Anti-resonant hollow core fibers, and in particular those with nested structural elements, have complex internal geometries, which makes it difficult for them to be produced exactly and reproducibly. This applies all the more because, if the resonance or anti-resonance conditions are to be maintained, even small variations in dimensions on the order of magnitude of the operating wavelength of the light to be guided cannot be tolerated. Deviations from the setpoint geometry can be caused by the configuration of the fiber preform, and they can also occur through undesired deformations that are not true to scale in the fiber-drawing process.

In the known "stack and draw" technique, many elements are to be joined together with positional accuracy. For example, in order to produce the hollow-core fiber known from the aforementioned paper in the "NANF" design, six anti-resonance element preforms, each consisting of an anti-resonance element outer tube (ARE outer tube, for short) and an anti-resonance preform inner tube welded on one side to the inner sheath surface of the ARE outer tube (ARE inner tube, for short) must be attached to the inner side of a cladding tube.

In order to achieve low attenuation values and broad transmission ranges, the azimuthal position of the anti-resonance elements within the cladding tube is also important, in addition to a uniform wall thickness of the walls of the anti-resonance elements. This cannot be easily achieved with the "stack and draw" technique. The aim of the invention is to specify a method for the cost-effective production of an anti-resonant hollow-core fiber that avoids the limitations of conventional production methods.

In particular, it is the object of the invention to provide a method for producing an anti-resonant hollow-core fiber and a preform for anti-resonant hollow core fibers, with which a high precision of the structural elements and an exact positioning of the anti-resonance elements in the fiber can be reproducibly achieved in a sufficiently stable and reproducible manner.

Moreover, disadvantages of the classic "stack and draw" technique, with which the required structural accuracies—in particular, a uniform wall thickness of the anti-resonance elements and exact positioning at predetermined azimuthal positions—is not easy to achieve, are to be avoided if at all possible.

SUMMARY OF THE INVENTION

With regard to the production of the anti-resonant hollow-core fiber, this object is achieved according to the invention starting from a method of the aforementioned genus in that the formation of the anti-resonance element precursors comprises the formation of elongated pressure chambers, which respectively adjoin, in the region of the setpoint positions of the anti-resonance elements, a wall that can be deformed under pressure and heat, and which, when a process according to method step (c) is carried out, cause a bulge in a section of the deformable wall in the direction of the inner cladding tube bore as a result of pressure and heat, thereby forming an anti-resonance element or a precursor thereof.

The starting point for producing the anti-resonant hollow-core fiber is a preform, which is also referred to herein as a "primary preform." It comprises a cladding tube in which or on which precursors or preforms for the shaping of anti-resonant elements are contained in the hollow-core fibers (referred to here as "anti-resonance elements" for short). The primary preform can be elongated to form the hollow-core fiber; however, as a rule, additional sheath material is added to the primary preform in order to produce therefrom a preform referred to herein as a "secondary preform." Optionally, the hollow-core fiber is produced by elongating the secondary preform. Alternatively, the primary preform or the secondary preform are surrounded by a collecting cylinder or a plurality of collecting cylinders to form a coaxial ensemble of components, and the coaxial ensemble is elongated directly to form the hollow-core fiber. The general term, "preform," is understood here to mean that component or that coaxial ensemble of components from which the hollow-core fiber is ultimately drawn.

The accuracy of the positioning of the anti-resonance elements is improved by designing the precursors for anti-resonance elements in the form of elongated pressure chambers formed in the region of the setpoint positions of the anti-resonance elements. The pressure chambers are designed to cause the adjoining wall sections of the inner cladding tube to bulge in the direction of the longitudinal cladding tube axis when these wall sections are softened and a gas pressure is applied in the pressure chambers.

When carrying out a process according to method step (c), the elongated pressure chambers cause an elongated bulge in an elongated section of the deformable wall in the direction of the inner cladding tube bore as a result of pressure and heat, thereby forming an elongated anti-resonance element or a precursor thereof.

The respective wall sections of the deformable wall to be bulged are elongated and run along the pressure chambers and the setpoint positions of the anti-resonance element precursors in the preform. In the simplest case, which is considered in more detail below, the bulged wall sections of the deformable wall belong to a glass tube.

In a first, preferred method variant, the pressure chambers are formed within the wall of the glass tube; in this case, they form hollow channels that run in parallel to the longitudinal axis of the glass tube from one end to the other end of the glass tube wall and are completely delimited by the glass of the glass tube.

In another preferred method variant, the pressure chambers are provided by a separate component which adjoins the outer sheath surface of the deformable glass tube wall. In this case, they form hollow channels that run in parallel to the longitudinal axis of the glass tube from one end to the other end along the glass tube wall and are delimited at one end by the glass of the glass tube.

In a further, preferred method variant, the pressure chambers are formed in recesses in the outer sheath surface of the glass tube wall; in this case, they likewise form hollow channels that run in parallel to the longitudinal axis of the glass tube from one end to the other end along the glass tube wall and are delimited by the glass of the glass tube in the region of the recess.

These method variants may also be combined with one another. So that a compressed gas can be introduced into the hollow channels, they are open at one end; advantageously—also for manufacturing reasons—they are open at both ends.

The anti-resonance element precursors are produced at these positions in one manufacturing step by causing the respective wall sections to bulge in the direction of the inner glass tube bore by applying a pressure acting from the outer side of the glass tube. This may take place, for example, when elongating the preform to form the hollow-core fiber or to form a semi-finished product.

Positioning and fixing of prefabricated anti-resonance element preforms at the respective positions of the inner wall of the cladding tube, as known in the stack-and-draw technique, can thus be omitted completely, or the number of anti-resonance element preforms to be thus positioned can at least be reduced.

With the invention, anti-resonant hollow core fibers and preforms for this purpose can be produced precisely and reproducibly.

The pressure chambers are, advantageously, designed as hollow channels which are adjoined by the wall sections of a glass tube to be deformed.

The hollow channels form pressure chambers into which a compressed gas can be introduced in a manufacturing step so that the wall sections of the glass tube accessible to the compressed gas are deformed as a result of the gas pressure.

Hollow Channels, Produced by Bores Within the Tube Wall of a Deformable Glass Tube In some of the aforementioned preferred methods, hollow channels that run in parallel to the longitudinal axis of the glass tube are formed within the glass tube wall.

The cross-section of the hollow channels may be circular or polygonal—in particular, triangular or rectangular. In the case of hollow channels with a rectangular shape, the long rectangular side runs tangentially to the wall section to be reshaped (bulged). In the case of hollow channels with a triangular shape, one of the triangle sides runs tangentially to the wall section to be reshaped (bulged). As a result, the gas pressure acts more strongly upon this wall section than in other directions.

In particular for producing complexly-shaped anti-resonance element preforms with nested structural elements, a method variant has proven to be advantageous in which a coaxial glass tube arrangement is formed, comprising an inner peripheral row of hollow channels in the tube wall of an inner glass tube and an outer peripheral row of hollow channels in the tube wall of an outer glass tube, wherein the hollow channels of the inner and outer peripheral rows lie on a common connecting line in the radial direction and are spatially separated from one another by at least one peripheral, inward-deformable glass wall.

The peripheral glass wall separates the pressure chambers of the inner and outer peripheral hollow channel rows from one another, and during the hot-forming process, it is bulged inwards by the hollow channels of the outer peripheral row.

If the peripheral glass wall belongs to the inner glass tube, the deformation of the outer glass tube can take place into a bulge of the inner glass tube, whereby an anti-resonance element preform is produced for a nested anti-resonance element.

Hollow Channels, Produced by Longitudinal Slots in an Intermediate Tube Wall Adjoining a Deformable Glass Tube Another, particularly elegant, method for forming the hollow channels comprises a measure in which an intermediate tube is arranged between the glass tube and an outer tube, said intermediate tube having a longitudinal axis of the intermediate tube, along which an intermediate tube wall delimited by an inner side and an outer side extends, wherein longitudinal slots are introduced into the intermediate tube wall, wherein hollow channels are formed from the longitudinal slots when a process according to method step (c) is carried out.

The longitudinal slots penetrate the wall of the intermediate tube (preferably with the exception of the two end-face end regions). They have parallel longitudinal edges.

The intermediate tube may rest against and be fused with the outer wall of the glass tube, and it may rest against and be fused with the inner wall of the outer tube. The longitudinal slots are located between the glass tube and the outer tube at the positions of the glass tube wall sections to be bulged. There, they form hollow channels or precursors of hollow channels, via which pressure can be applied to the outer side of the glass tube in a later manufacturing step, in order to thus cause the softened material of the glass tube to bulge in the direction of its inner bore. In doing so, the hollow channels are deformed into the elongated bulges as a result of pressure and heat.

An advantage of this embodiment is that the distance of the hollow channels from the inner bore becomes particularly uniform over their length and among them.

Advantageously, when carrying out a hot-forming process according to method step (c), an internal pressure is generated in the hollow channels by introducing a compressed gas, and the wall sections of the glass tube that are accessible to the compressed gas through the longitudinal slots are thereby deformed. In doing so, elongated bulges pointing inwards, in the direction of the inner glass tube bore and in the direction of the hollow core, form on the glass tube, said bulges serving as anti-resonance element preforms or as anti-resonance elements.

The longitudinal slots preferably end prior to the end-face ends of the intermediate tube in order to ensure the cohesion of the remaining longitudinal webs.

In particular for producing complexly-shaped anti-resonance element preforms with nested structural elements, a method variant has proven to be advantageous in which a coaxial tube arrangement is formed, comprising an inner glass tube, an inner intermediate tube, an inner outer tube that at the same time forms an outer glass tube, an outer intermediate tube, and an external outer tube, wherein the longitudinal slots of the inner and outer intermediate tubes lie on a common connecting line in the radial direction and are spatially separated from one another by at least one peripheral, inward-deformable glass wall.

Such coaxial tube arrangements serve to produce at least two hollow channels or pressure chambers, which are arranged one behind the other in pairs when viewed in the radial direction. The peripheral glass wall separates the pressure chambers of the inner and outer peripheral hollow channel rows from one another, and during the hot-forming process, it is bulged inwards by the hollow channels of the outer peripheral row. If the peripheral glass wall belongs to the inner glass tube, the deformation of the outer glass tube can take place into a bulge of the inner glass tube, whereby an anti-resonance element preform is produced for a nested anti-resonance element.

Preferably, an intermediate tube having a circular, inner cross-section is provided and machined. The longitudinal slots are designed to be continuous in the radial direction and can be manufactured easily and precisely—for example, by milling, drilling, or cutting. The inner geometry of the longitudinal slots or grooves is rectangular or v-shaped, for example.

The longitudinal slots are preferably produced by machining the intermediate tube wall—in particular, by cutting, drilling, sawing, milling, or grinding.

Machining is understood to mean mechanical machining techniques that remove material, such as turning, separating, drilling, sawing, milling, or grinding. In comparison to other known forming techniques, said machining techniques provide more precise and more filigree structures by using heat and pressure and avoid contamination of surfaces by molding tools, such as nozzles, presses, or fusion molds.

It has proven useful if the longitudinal slots have longitudinal edges, and the glass tube and the outer tube are connected to the longitudinal edges by softening.

For this purpose, the coaxial tube ensemble consisting of outer tube, longitudinally-slotted intermediate tube, and glass tube is heated, and, in the process, the cutting edges of the longitudinal slots are connected over their entire length to the outer wall of the glass tube and to the inner wall of the outer tube. Undesired deformations in the radial direction are suppressed by simultaneous elongation. Alternatively, the tubes are connected to one another in pairs, one after the other, in two process steps.

In this way, a preform is obtained in which the original longitudinal slots are enclosed as hollow channels. They can be exposed on one side or on both sides by removing the closed end-face end regions of the preform.

Hollow Channels, Produced by Longitudinal Grooves on a Deformable Glass Tube and/or on an Intermediate Tube Adjoining the Glass Tube Instead of or in addition to the methods explained above for forming the hollow channels, it has also proven useful if the formation of the hollow channels comprises a measure in which a glass tube and an intermediate tube are used, which coaxially surrounds the glass tube, wherein the glass tube has an outer sheath surface of the glass tube, into which surface longitudinal grooves are introduced that run in parallel to the longitudinal axis of the glass tube, and/or the intermediate tube has an inner sheath surface of the intermediate tube, into which surface longitudinal grooves are introduced that run in parallel to the longitudinal axis of the intermediate tube, wherein hollow channels are formed from the longitudinal grooves when carrying out a process according to method step (c), and wherein the hollow channels are deformed into the elongated bulges as a result of pressure and heat.

In cooperation with a tube wall surrounding the glass tube, the longitudinal grooves in the outer sheath surface of the glass tube likewise form channels and thus pressure chambers for deforming the wall sections in which the longitudinal grooves run. The longitudinal grooves on the inner sheath surface of the intermediate tube serve to form the hollow channels in a manner similar to the longitudinal slots of the intermediate tube, as explained in detail above.

It is helpful for pressurization if the longitudinal grooves are continuous, i.e., they preferably extend from one end of the respective tube to the opposite end.

With regard to the production of the preform for the hollow-core fiber, the aforementioned technical object is achieved according to the invention starting from a method of the aforementioned genus in that the formation of the anti-resonance element precursors comprises the formation of elongated pressure chambers, which respectively adjoin, in the region of the setpoint positions of the anti-resonance elements, a wall that can be deformed under pressure and heat, and which, when a process according to method step (c) is carried out, cause a bulge in a section of the deformable wall in the direction of the inner cladding tube bore as a result of pressure and heat, thereby forming an anti-resonance element or a precursor thereof.

The preform is a starting point for the production of the anti-resonant hollow-core fiber. By elongating the preform, either the anti-resonant hollow-core fiber is drawn directly, or a semi-finished product is initially produced from which the anti-resonant hollow-core fiber is subsequently drawn. The production of the preform includes causing wall sections of the glass tube to bulge in the region of the setpoint positions of the anti-resonance elements by applying pressure in the pressure chambers.

The wall sections of the glass tube to be bulged are elongated and run along the setpoint positions of the anti-resonance element precursors in the preform. The anti-resonance element precursors are produced at these positions in one manufacturing step by causing the respective wall sections to bulge in the direction of the inner cladding tube bore by applying a pressure acting from the opposite wall side. Positioning and fixing of prefabricated anti-resonance element preforms at the respective positions of the inner wall of the cladding tube, as known in the stack-and-draw technique, can thus be omitted completely, or the number of anti-resonance element preforms to be thus positioned can at least be reduced. Measures for producing the preform are explained above in connection with the production of the hollow-core fiber, and these explanations are included herewith.

Definitions

Individual method steps and terms of the above description are additionally defined below. The definitions form part of the description of the invention. That which is expressed in the description is definitive in the event of a factual contradiction between one of the following definitions and the remaining description.

Anti-Resonance Elements

The anti-resonance elements may be simple or nested structural elements of the hollow-core fiber. They have at least two walls which, when viewed from the direction of the hollow core, have a negative curvature (convex) or have no curvature (planar, straight). They generally consist of a material that is transparent to the working light, e.g., of glass—in particular, doped or non-doped $SiO_2$—of a plastic—in particular, a polymer—of a composite material, or of crystalline material.

Anti-Resonance Element Preform/Anti-Resonance Element Precursor

What are referred to as anti-resonance element preforms are components or constituents of the preform that essentially become anti-resonance elements in the hollow-core fiber by simple lengthening during the fiber-drawing process. Components or constituents of the preform that are first formed into anti-resonance element preforms or directly into anti-resonance elements by forming are referred to as anti-resonance element precursors. The anti-resonance element preforms may be simple or nested components to which additional positioning aids can be fixed. They are originally present in the primary preform.

Nested anti-resonance element preforms form nested anti-resonance elements in the hollow-core fiber. They are composed of an outer tube and at least one further structural element that is arranged in the inner bore of the outer tube. The further structural element may be a further tube which bears against the inner sheath surface of the outer tube. The outer tube is referred to as an "anti-resonance element outer tube" or an "ARE outer tube" for short, and the further tube is referred to as an "anti-resonance element inner tube" or an "ARE inner tube" for short, or also as a "nested ARE inner tube."

In the case of multiple, nested anti-resonance element preforms, at least one further structural element, e.g., a third tube abutting against the inner sheath surface of the nested ARE inner tube, may be arranged in the inner bore of the nested ARE inner tube. Where there are multiple, nested anti-resonance element preforms, in order to distinguish between the multiple tubes that are arranged within the ARE outer tube, a distinction can optionally be made between "outer nested ARE inner tube" and "inner nested ARE inner tube."

The term, "cross-section," in conjunction with cylindrical anti-resonance element preforms and their cylindrical structural elements always refers to the cross-section perpendicular to the respective longitudinal axis of the cylinder, viz., unless otherwise indicated, the cross-section of the outer contour in tubular components (not the cross-section of the inner contour).

Further processing of the primary preform—in particular, by hot-forming steps—can result in intermediate products in which the original anti-resonance element preforms are present in a shape that has been modified vis-à-vis the original shape. The modified shape is also referred to herein as an anti-resonance element preform or as an anti-resonance element precursor.

Preform/Primary Preform/Secondary Preform/Core Preform (Cane)

The preform is the component from which the anti-resonant hollow-core fiber is drawn. It is a primary preform or a secondary preform produced by further processing of the primary preform. The primary preform may be present as an ensemble consisting of at least one cladding tube and preforms or precursors for anti-resonance elements that are loosely accommodated or firmly fixed therein. The further processing of the primary preform into a secondary preform from which the hollow-core fiber is drawn may comprise a single or repeated execution of one or more of the following hot-forming processes:
(i) elongation,
(ii) collapse,
(iii) collapse and simultaneous elongation,
(iv) collapse of additional sheath material,
(v) collapse of additional sheath material and subsequent elongation,
(vi) collapse of additional sheath material and simultaneous elongation.

A preform obtained by collapsing and/or elongating a primary preform is referred to in the literature as a cane. Typically, it is overlaid with additional sheath material before or during drawing of the hollow-core fiber.

Elongating/Collapsing

During elongation, the primary preform is lengthened. The lengthening can take place without simultaneous collapse. Elongation can take place true-to-scale so that, for example, the shape and arrangement of components or constituents of the primary preform is reflected in the elongated end product. During elongation, however, the primary preform can also be drawn not true-to-scale, and its geometry can be modified.

During collapse, an inner bore is narrowed, or annular gaps between tubular components are closed or narrowed. Collapse is generally accompanied by elongation.

Hollow Core/Inner Sheath Region/Outer Sheath Region

The ensemble comprising at least one cladding tube and therein loosely-accommodated or firmly-fixed preforms or precursors for anti-resonance elements is also referred to herein as "primary preform." The primary preform comprises the hollow core and a sheath region. This sheath region is also referred to as an "inner sheath region" if there is also an "outer sheath region" which has been produced, for example, by collapsing onto the ensemble, and if a distinction is to be made between said sheath regions. The terms, "inner sheath region" and "outer sheath region," are also used for the corresponding regions in the hollow-core fiber or in intermediate products obtained by further processing of the primary preform.

The designation, "inner side of the tube," is also used as a synonym for "inner sheath surface of the tube," and the designation, "outer side of the tube," is also used as a synonym for "outer sheath surface of the tube." The term, "inner bore," in conjunction with a tube does not mean that the inner bore has been produced by a drilling process.

Machining

This refers to separating mechanical manufacturing methods for the separating processing of a workpiece—in particular, turning, cutting, drilling, sawing, milling, and grinding. This machining creates a longitudinal structure extending in the direction of the longitudinal axis of the cladding tube and serves as a positioning aid for the anti-resonance element preforms. The longitudinal structure is accessible from the inner side of the cladding tube; it may also extend through the entire cladding tube wall to the outer side.

Particle Size and Particle-Size Distribution

Particle size and particle-size distribution of the $SiO_2$ particles are characterized using the $D_{50}$ values. These values are taken from particle-size distribution curves showing the cumulative volume of $SiO_2$ particles as a function of the particle size. The particle-size distributions are often characterized on the basis of the respective $D_{10}$, $D_{50}$, and $D_{90}$ values. In this case, the $D_{10}$ value characterizes the particle size that is not achieved by 10% of the cumulative volume of the $SiO_2$ particles, and accordingly, the $D_{50}$ value and the $D_{90}$ value characterize the particle sizes that are not achieved by 50% and by 90%, respectively, of the cumulative volume of the $SiO_2$ particles. The particle-size distribution is determined by scattered light and laser diffraction spectroscopy according to ISO 13320.

EXEMPLARY EMBODIMENT

The invention is explained in more detail below with reference to an exemplary embodiment and a drawing. The following are shown in detail in schematic representation:

FIG. 1 a first embodiment of an intermediate tube provided with longitudinal slots for use in the method according to the invention in a side view (a) and in a plan view (b) of a cross-section, FIG. 2 method steps for producing a preform (b) for a hollow-core fiber using a tube ensemble (a) having several slotted, intermediate tubes, with reference to a first example, FIG. 3 the fiber-drawing of the preform of FIG. 3 to form a hollow-core fiber, thereby forming anti-resonance elements in a cutout of the preform of FIG. 2(b) in an enlarged view, FIG. 4 a second embodiment of an intermediate tube provided with longitudinal slots in a side view (a) and in a plan view (b) of a cross-section, FIG. 5 method steps for producing a preform (b) for a hollow-core fiber using a tube ensemble (a) having a slotted, intermediate tube, with reference to a second example, FIG. 6 the fiber-drawing of the preform of FIG. 5 to form a hollow-core fiber, thereby forming anti-resonance elements in a cutout of the preform of FIG. 5(b) in an enlarged view, and FIG. 7 a coaxial arrangement of a glass tube with a thermally-deformable wall, which contains hollow channels, and an overlay cylinder in a plan view.

FIG. 1(a) shows an intermediate tube 10 in the wall of which, at previously defined azimuthal positions, longitudinal slots 13 are cut at regular intervals—for example, by means of a mechanical saw, water-jet cutting, laser, or the like. The longitudinal slots 13 serve to form anti-resonance elements in the finished hollow-core fiber or to form anti-resonance element preforms in a fiber preform, and the number of longitudinal slots 13 corresponds to the number of anti-resonance element preforms or anti-resonance elements that can be produced with the respective intermediate tube 10. In the exemplary embodiment, there are six anti-resonance element preforms or anti-resonance elements. The longitudinal slots 13 end prior to the tube ends so that the end-face end regions 12 continue to remain closed circumferentially and connect the remaining webs 14 to one another. The cut edges are subsequently vitrified. The cutting width of the longitudinal slots 13 is uniform and is 2 mm.

It can be seen from the plan view of the cross-section of the intermediate tube 10 along the sectional line A-A in FIG. 1(b) that the six longitudinal slots 13 are distributed evenly around the tube wall, and that they extend continuously from the outer wall of the intermediate tube to the inner wall of the intermediate tube up to the inner bore 16.

FIG. 2(a) schematically shows a plan view of a coaxial arrangement 19 of a total of five quartz glass tubes, including two intermediate tubes 10; 20, each with longitudinal slots 13. The coaxial tube arrangement 19 is composed of two coaxial stacks, which are each composed of a glass tube (21; 22) to be deformed, an intermediate tube (10; 20), and a sheath tube (22; 23). The tube with reference sign 22 has a dual function: in the inner stack, it forms a "sheath tube" and its wall becomes a constituent of the wall of hollow channels, and, in the outer stack, it forms a "glass tube" with a wall to be deformed.

Details on the dimensions and materials of the tubes are summarized in Table 1 below:

TABLE 1

| RS | Identifier/Function | Inner diameter | Outer diameter | Material |
|---|---|---|---|---|
| 21 | Glass tube to be deformed | 21 | 24 | F-doped; F320 |
| 10 | Intermediate tube | 25 | 31.5 | Non-doped; |
| 22 | Glass tube or sheath tube to be deformed | 32.5 | 34 | F-doped; F320 |

TABLE 1-continued

| RS | Identifier/Function | Inner diameter | Outer diameter | Material |
|---|---|---|---|---|
| 20 | Intermediate tube | 35 | 39 | Non-doped |
| 23 | Sheath tube | 40 | 60 | Non-doped |

RS: Reference sign in FIG. 2a
F-doped; F320: Quartz glass doped with fluorine/low viscosity
Non-doped: Non-doped quartz glass/high viscosity The materials used differ in terms of their viscosity. The unmachined tubes 21 and 22 consist of a commercially available quartz glass doped with fluorine (trade name: F320) and have a lower viscosity than the slotted, intermediate tubes 10, 20 and than the outermost sheath tube 23 (overlay tube).

FIG. 2(b) shows that the coaxial tube ensemble 19 is subsequently collapsed to form a primary preform 26 and is simultaneously elongated in the process. In this case, the annular gaps between the tubes disappear, and the tubes are fixedly connected to one another and form the cladding tube having a common cladding tube wall 24. Hollow channels are formed from the longitudinal slots 13 of the slotted intermediate tubes 10; 20 and can be used as front and rear pressure chambers 25a; 25b in the subsequent fiber-drawing process. In this case, two pressure chambers 25a, 25b each lie, one behind the other, in pairs when viewed in the radial direction. Before the fiber-drawing process, at least one of the closed, longitudinal, slot-free end regions of the primary preform 26 is removed so that pressure chambers 25a, 25b that are open at the end face are obtained, into which a compressed gas can be introduced. The primary preform 26 has a hollow core region 27 surrounded by a sheath (cladding tube wall 24). The pressure chambers 25a; 25b form precursors for anti-resonance elements of the hollow-core fiber to be drawn in the cladding tube wall 24.

The cutout of FIG. 3(a) shows in an enlargement the pressure chambers 25a; 25b produced from the original longitudinal slots in the cladding tube wall 24. When the preform thus obtained is drawn to form the fiber, a differential pressure is applied between the pressure chambers 25a, 25b and the hollow core region 27 so that the deformable wall regions of the original glass tubes 21; 22 adjoining the pressure chambers 25a; 25b are blown inwards along the pressure chambers 25a, 25b.

FIG. 3(b) shows that, in doing so, a first bulge 28a, which encloses a second bulge 28b, arises in the hollow-core fiber 29 on the inner side 17 of the former innermost glass tube. The first and second bulges 28a; 28b form a nested, anti-resonance element with two glass membranes having a negatively-curved surface.

Insofar as the same reference signs are used in the following description of FIGS. 4 to 7 as in FIGS. 1 to 3, identical or equivalent components or constituents are denoted thereby, as explained in more detail above with reference to these figures.

FIG. 4(a) shows another intermediate tube 110 in the wall of which, at previously defined azimuthal positions, longitudinal slots 13 are cut at regular intervals—for example, by means of a mechanical saw, water-jet cutting, laser, or the like. The longitudinal slots 13 serve to form anti-resonance elements in the finished hollow-core fiber or to form anti-resonance element preforms in a fiber preform, and the number of longitudinal slots 13 corresponds to the number of anti-resonance element preforms or anti-resonance elements that can be produced with the respective intermediate tube 10. In the exemplary embodiment, there are five anti-resonance element preforms or anti-resonance elements. The longitudinal slots 13 end prior to the tube ends so that the end-face end regions 12 continue to remain closed circumferentially and connect the remaining webs 14 to one another. The cut edges are subsequently vitrified. The cutting width of the longitudinal slots 13 is uniform and is 2 mm.

It can be seen from the plan view of the cross-section of the intermediate tube 110 along the sectional line A-A in FIG. 4(b) that the five longitudinal slots 13 are distributed evenly around the tube wall at a circumferential angle of 72 degrees, and that they extend continuously from the outer wall of the intermediate tube to the inner wall of the intermediate tube up to the inner bore 16.

FIG. 5(a) schematically shows a plan view of a coaxial ensemble of a total of three quartz-glass tubes, including the slotted, intermediate tube 110. The coaxial tube ensemble is composed of a glass tube 21 to be deformed, the intermediate tube 110 with the longitudinal slots 13, and a sheath tube 22.

Details on the dimensions and materials of the tubes are summarized in Table 2 below:

TABLE 2

| RS | Identifier/ Function | Inner diameter [mm] | Outer diameter [mm] | Material |
|---|---|---|---|---|
| 21 | Glass tube to be deformed | 21 | 24 | F-doped; F320 |
| 110 | Intermediate tube | 25 | 31.5 | Non-doped; |
| 22 | Sheath tube | 32.5 | 60 | Non-doped |

RS: Reference sign in FIG. 5a
F-doped; F320: Quartz glass doped with fluorine/low viscosity
Non-doped: non-doped quartz glass/high viscosity The materials used differ in terms of their viscosity. The mechanically unmachined tube 21 consists of a commercially available quartz glass doped with fluorine (trade name: F320) and has a lower viscosity than the slotted intermediate tube 110 and the sheath tube 22 (overlay tube).

FIG. 5(b) shows that the coaxial tube ensemble subsequently collapses to form a primary preform 126. In this case, it is elongated at the same time, and the annular gaps between the tubes 21, 22, 110 disappear, so that they are firmly connected to one another, so that they form a common cladding tube wall 124. In doing so, hollow channels form in the cladding tube wall 124 from the longitudinal slots 13 of the slotted intermediate tube 110 and can be used as pressure chambers 125 in the subsequent fiber-drawing process. The primary preform 126 has a hollow core region 127 surrounded by a sheath (cladding tube wall 124). The pressure chambers 125 form precursors for anti-resonance elements in the sheath region of the hollow-core fiber to be drawn.

Before the fiber-drawing process, at least one of the closed, longitudinal slot-free end regions of the preform 126 is removed so that the pressure chambers 125 are open at the end face, and a compressed gas can be introduced.

The cutout of FIG. 6(a) shows a pressure chamber 125 produced from an original longitudinal slot 13 in an enlargement. When the preform 126 thus obtained is drawn to form the fiber, a differential pressure is applied between the pressure chambers 125 and the inner bore 16 so that the wall region adjoining the pressure chambers 125 is blown inwards along the pressure chamber 125.

FIG. 6(b) shows that a bulge 128, which forms an anti-resonance element with a glass membrane with a negatively-curved surface, arises in the hollow-core fiber 129 on the inner side 117 of the former glass tube.

Instead of the longitudinal slots 13, the intermediate tubes 10, 20, 110 can also be provided with longitudinal grooves on their inner sheath surface. If necessary, the longitudinal grooves are produced by mechanical milling in the inner sheath surface of the intermediate tube.

Instead of or in addition to the intermediate tubes provided with longitudinal slots or longitudinal grooves, the glass tubes 21; 22 may also be provided with a thermally-deformable wall with longitudinal grooves on its outer sheath surface. If necessary, the longitudinal grooves are produced by mechanical milling in the outer sheath surface of the glass tube.

Instead of or in addition to the aforementioned embodiments of glass tubes and/or intermediate tubes with longitudinal slots or longitudinal grooves, the glass tubes 21; 22 may also be provided with a thermally-deformable wall with hollow channels. With respect to this, FIG. 7 schematically shows an exemplary embodiment. The coaxial arrangement comprises a glass tube 221 with a thermally-deformable wall and an overlay cylinder 22 (sheath tube). Within the wall of the glass tube 221 and close to the inner sheath surface 221a, four hollow channels 213 distributed evenly around the circumference run in parallel to the longitudinal axis of the glass tube (which extends perpendicularly to the paper plane). The hollow channels 213 are produced by laser-cutting and continuous (they extend from one end of the wall to the other end). In the cross-section shown, they have a rectangular shape, wherein the long rectangular side runs tangentially to the adjacent wall section of the inner sheath surface 221a.

An intermediate tube can be dispensed with in this embodiment. Details on the dimensions and materials of the tubes are summarized in Table 3 below:

TABLE 3

| RS | Identifier/ Function | Inner diameter [mm] | Outer diameter [mm] | Material |
|---|---|---|---|---|
| 221 | Glass tube to be deformed | 21 | 24 | F-doped; F320 |
| 22 | Sheath tube | 25 | 60 | Non-doped |

RS: Reference sign in FIG. 7
F-doped; F320: Quartz glass doped with fluorine/low viscosity
Non-doped: non-doped quartz glass/high viscosity When carrying out a hot-forming process, an internal pressure can be generated in the hollow channels 213 by introducing a compressed gas, thereby deforming the wall sections of the glass tube 221, which delimits the hollow channels 213 inwards. In the process, elongated bulges pointing inwards, in the direction of the inner glass tube bore 16, form on the glass tube 221 and serve as anti-resonance element preforms.

The invention claimed is:

1. Method for producing an anti-resonant hollow-core fiber comprising a hollow core, extending along a longitudinal axis of the fiber, and a sheath region surrounding the hollow core and comprising a number of anti-resonance elements, having the method steps of:
   (a) providing a primary preform for the hollow-core fiber, which preform has at least one cladding tube having a cladding tube wall, an inner cladding tube bore and a longitudinal cladding tube axis, along which the cladding tube wall delimited by an inner side and an outer side extends, (b) forming a number of precursors for anti-resonance elements at setpoint positions of the cladding tube wall, and (c) elongating the primary preform to form the hollow-core fiber or further processing the primary preform to form a secondary preform from which the hollow-core fiber is drawn, wherein the further processing comprises carrying out one or more of the following hot-forming processes once or repeatedly:
 (i) elongation,
 (ii) collapse,
 (iii) collapse and simultaneous elongation,
 (iv) collapse of additional sheath material,
 (v) collapse of additional sheath material and subsequent elongation,
 (vi) collapse of additional sheath material and simultaneous elongation, wherein the formation of the anti-resonance element precursors comprises the formation of elongated pressure chambers, which respectively adjoin, in the region of the setpoint positions of the anti-resonance elements, a deformable wall that can be deformed under pressure and heat, and which, when a process according to method step (c) is carried out, cause a bulge in a section of the deformable wall in the direction of the inner cladding tube bore as a result of pressure and heat, thereby forming an anti-resonance element or a precursor thereof.

2. The method according to claim 1, wherein the pressure chambers are designed as hollow channels which are adjoined by wall sections of a glass tube.

3. The method according to claim 2, wherein the hollow channels are formed within the wall of the glass tube and run in parallel to the longitudinal axis of the glass tube.

4. The method according to claim 3, wherein a coaxial glass tube arrangement is formed, comprising an inner peripheral row of hollow channels in the tube wall of an inner glass tube and an outer peripheral row of hollow channels in the tube wall of an outer glass tube, wherein the hollow channels of the inner and outer peripheral rows lie on a common connecting line when viewed in the radial direction and are spatially separated from one another by at least one peripheral, inward-deformable glass wall.

5. The method according to claim 2, wherein the formation of the hollow channels comprises a measure in which an intermediate tube is arranged between the glass tube and an outer tube, said intermediate tube having a longitudinal axis of the intermediate tube, along which an intermediate tube wall delimited by an inner side and an outer side extends, and in that longitudinal slots are introduced into the intermediate tube wall, wherein hollow channels are formed from the longitudinal slots when a process according to method step (c) is carried out.

6. The method according to claim 5, wherein an intermediate tube with a circular inner cross-section is provided and machined.

7. The method according to claim 5, wherein the intermediate tube has end-face ends, and in that the longitudinal slots end prior to the end-face ends.

8. The method according to claim 5, wherein a coaxial tube arrangement is formed, comprising the glass tube, which is an inner glass tube, the intermediate tube, which is an inner intermediate tube, the outer tube, which is an inner outer tube that at the same time forms an outer glass tube, an outer intermediate tube, and an external outer tube, wherein the longitudinal slots of the inner and outer intermediate tubes lie on a common connecting line in the radial direction and are spatially separated from one another by at least one peripheral, inward-deformable glass wall.

9. The method according to claim 5, wherein the longitudinal slots or the longitudinal grooves are produced by at least one of cutting, drilling, sawing, milling, and grinding.

10. The method according to claim 5, wherein the longitudinal slots have longitudinal edges, and in that the longitudinal edges are fused with surrounding glass material by softening with simultaneous elongation.

11. The method according to claim 2, wherein the formation of the hollow channels comprises a measure in which the glass tube and an intermediate tube are used, which coaxially surrounds the glass tube, wherein the glass tube has an outer sheath surface of the glass tube, into which surface longitudinal grooves are introduced that run in parallel to the longitudinal axis of the glass tube, and/or the intermediate tube has an inner sheath surface of the intermediate tube, into which surface longitudinal grooves are introduced that run in parallel to the longitudinal axis of the intermediate tube, wherein hollow channels are formed from the longitudinal grooves when carrying out a process according to method step (c), and wherein the hollow channels are deformed into elongated bulges as a result of pressure and heat.

12. The method according to claim 2, wherein the glass tube consists of a glass containing a dopant that lowers the viscosity.

13. The method for producing a preform for an anti-resonant hollow-core fiber having a hollow core, extending along a longitudinal axis of the fiber, and a sheath region surrounding the hollow core, said sheath region comprising a plurality of anti-resonance elements, having the method steps of:
 (a) providing a primary preform for the hollow-core fiber, which preform has at least one cladding tube having an inner cladding tube bore and a longitudinal cladding tube axis, along which a cladding tube wall delimited by an inner side and an outer side extends,
 (b) forming a number of precursors for anti-resonance elements at setpoint positions of the cladding tube wall,
 (c) optional further processing of the primary preform to form a secondary preform for the hollow-core fiber, wherein the further processing comprises carrying out one or more of the following hot-forming processes once or repeatedly:
  (i) elongation,
  (ii) collapse,
  (iii) collapse and simultaneous elongation,
  (iv) collapse of additional sheath material,
  (v) collapse of additional sheath material and subsequent elongation,
  (vi) collapse of additional sheath material and simultaneous elongation,
 wherein the formation of the anti-resonance element precursors comprises the formation of elongated pressure chambers, which respectively adjoin, in the region of the setpoint positions of the anti-resonance elements, a wall that can be deformed under pressure and heat, and which, when a process according to method step (c) is carried out, cause a bulge in a section of the deformable wall in the direction of the inner cladding tube bore as a result of pressure and heat, thereby forming an anti-resonance element or a precursor thereof.

* * * * *